MOUNTING PAN FOR ELECTRICAL PANEL BOARD

Filed Feb. 6, 1969 3 Sheets-Sheet 1

INVENTOR
ROBERT J. DUBIEL

BY Hauke, Kraus, Gifford, & Patalidis

ATTORNEYS

MOUNTING PAN FOR ELECTRICAL PANEL BOARD

Filed Feb. 6, 1969

INVENTOR
ROBERT J. DUBIEL

BY Hauke, Krass, Gifford, & Patalidis
ATTORNEYS

MOUNTING PAN FOR ELECTRICAL PANEL BOARD

Filed Feb. 6, 1969 3 Sheets-Sheet 3

INVENTOR
ROBERT J. DUBIEL

BY Hauke, Kraus, Gifford, & Patalidis
ATTORNEYS

United States Patent Office 3,606,019
Patented Sept. 20, 1971

3,606,019
MOUNTING PAN FOR ELECTRICAL PANEL BOARD

Robert J. Dubiel, 22140 Guidot, Taylor, Mich. 48180

Filed Feb. 6, 1969, Ser. No. 797,041
Int. Cl. A47f 7/00
U.S. Cl. 211—26 16 Claims

ABSTRACT OF THE DISCLOSURE

A mounting pan for electrical components, such as relays or the like, for mounting on a panel board or cabinet wall panel, having appropriate apertures for mounting on the panel board or wall panel and a pair of parallel side channels provided with apertures for mounting of the components on the pan, and retaining means dependent from the channels for holding captive mounting nuts and the like. A modification of the pan is constructed to be adjustable in width for adaptability to be adjustable to various sizes of components.

BACKGROUND OF THE INVENTION

(I) Field of the invention

The present invention relates to mounting means for electrical components, and more particularly, to a mounting pan for coveniently and detachably mounting a plurality of electrical components in particular relays, circuit breakers, and the like. The invention is related to electrical installations such as electrical equipment cabinets, switchboards, communication equipment and the like in which are mounted a considerable number of pre-assembled electrical components which have to be secured therein or thereon at particular locations.

(II) Description of the prior art

It is known to provide panels or panel boards for electrical installations adapted for mounting a plurality of electrical pre-fabricated components, such as relays, circuit breakers and the like, in a multiple of pre-selected positions. Due to the relative complexity of such electrical installations, the assembly of these components, if not provided with properly designed mounting means, is prohibitively time consuming. Thus, mounting panels or pans for these components have been designed adaptable to provide means to be mounted in an installation at any desired location and, concurrently, to provide means for mounting electrical components at selective positions along the mounting panel or pan, as required by the schematic of the electrical circuit. Although the known mounting panels or pans provide a relatively wide choice of mounting locations for the electrical components to be mounted thereon, these locations, nevertheless, are fixed and thus permit only the mounting of components at known intervals and having the required mounting dimensions to suit the predesigned mounting locations on the panels or pans. Such an example, for instance, is disclosed in U.S. Pat. No. 1,919,166, dated July 18, 1933, issued to F. C. Lavarack. However, with the advance of more sophisticated equipment, electrical components have become smaller and often have different mounting dimensions which do not readily match the predetermined locations of mounting apertures and the like on conventional mounting panels or pans. Consequently, upon installation, additional mounting apertures must be drilled into the mounting panels or pans for the attachment of these components at increased labor time and cost.

SUMMARY OF THE INVENTION

The present invention provides an improved mounting pan which overcomes the foregoing disadvantages by the provision of means associated with the present improved mounting pan to enable quick and easy mounting of any type and size of electrical components at various selected locations along the mounting pan and which permit easy installation of the mounting pan itself.

In the basic embodiment of the present invention, the improved mounting pan comprises a substantially flat elongated member of sheet material provided at predetermined spaced locations with a plurality of apertures or slots in various positions relative to each other so as to permit the mounting of the pan in a variety of positions and locations in the electrical installation as may be required. The present improved pan is further provided along its longitudinal sides with channels adapted to receive and retain a plurality of fasteners, the upper surface of these side channels being provided with a plurality of longitudinal apertures or slots placed as close together as possible without danger of weakening the structure. By this means, various electrical components can be conveniently and easily attached to the improved mounting pan at a variety of desired locations along the mounting pan. Due to the provisions of captive fasteners along the sides of the mounting pan within the side channels of the mounting pan and the substantially unlimited number of mounting locations, the installation of electrical components, for which only simple tools are needed, can be performed by relatively unskilled labor.

In a modification of the present novel mounting pan, the mounting pan is composed of two substantially identical halves, divided along the longitudinal center of the pan in such a way as to overlap along the longitudinal mid-portion and having respective overlapping apertures at various locations along the mid-portion so that the pan can be adjusted with respect to its width to accommodate various sizes of electrical components and thereby eliminating the necessity of providing various sizes of mounting pans. Once the adjusted mounting pan is fastened on the electrical panel board or cabinet wall through aligned overlapping apertures, it provides a solid unit, since the fastening means attach both parts simultaneously to the panel board, cabinet, wall or other electrical equipment.

In another modification, the improved mounting pan is constructed of two separate parallel rails or channels which are provided with the same component mounting means as hereinbefore referred to, such as a plurality of apertures and captive fasteners. The opposite parallel channers are connected together by a plurality of parallel bars or struts which are pivotally secured to the channels so as to enable the structure to be formed in the fashion of a parallelogram for adjustment of the width of the mounting pan by displacing the connecting bars or struts in a diagonal position. The connecting bars or struts are provided each with appropriate apertures for mounting of the pan to the electrical panel board, cabinet or the like, in the adjusted width as required by the size of the components to be mounted there on. Other novel features and advantages will be made apparent by the following detailed description with reference to the attached drawings.

DESCRIPTION OF THE PREFERRED EMBODIMENT

Figures 1, 2:
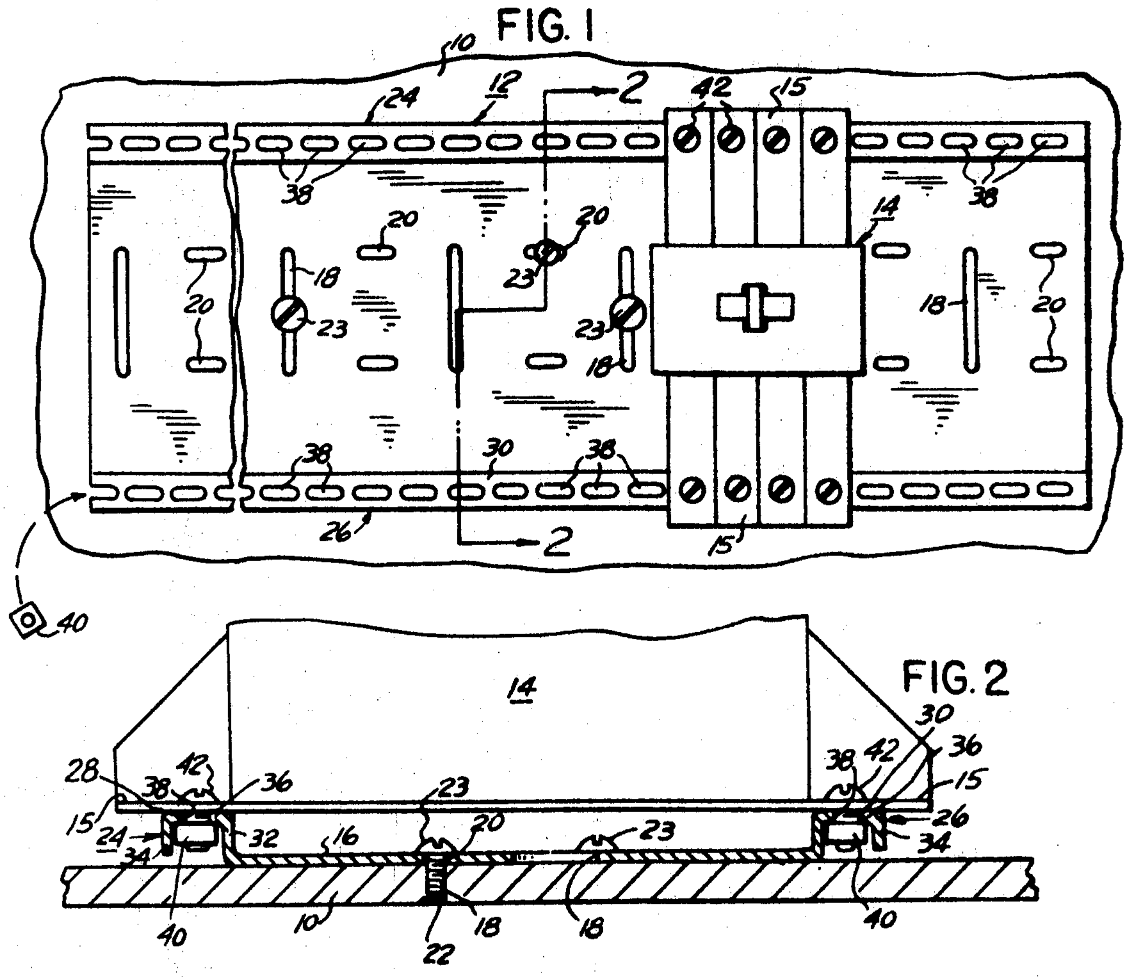
FIG. 1 is a plan view of an example of embodiment of the present novel mounting pan in an installed position having an electrical component mounted thereon.
FIG. 2 is an enlarged cross section through the mounting pan shown in FIG. 1 along lines 2—2 thereof.
Figure 3:
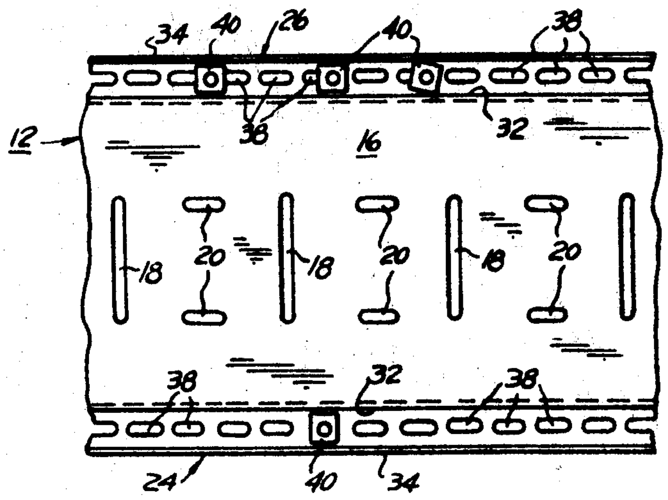
FIG. 3 is a fragmentary, detached plan view of the underside of the mounting pan shown in FIG. 1.

With reference to FIGS. 1 to 3, there is shown for illustration a wall 10 of a cabinet or other electrical installation to which is mounted in substantially flat relationship thereto a mounting pan 12 of the present novel construction. The mounting pan 12 is of predetermined width, as determined by the particular installation, and is adapted for mounting of a plurality of electrical components thereon along its length, one of which is shown for example at 14. These components may be relays, circuit breakers or the like, which are usually supplied ready for attachment at the desired location within the electrical installation. The mounting pan 12 is constructed from a length of flat sheet material, preferably sheet steel and the like or may be made of synthetic material, which is pre-cut to the desired length. The pan 12 has a flat planar elongated body portion 16 adapted for abutment against the wall 10 of the electrical cabinet or the like. The elongated planar body portion 16 of the pan 12 is provided at spaced intervals with a first group of a plurality of longitudinal apertures 18 and a likewise spaced second group of a plurality of longitudinal apertures 20 positioned in a different longitudinal direction relative to the apertures 18. The apertures 18 and 20 are adapted for mounting the pan 12 to the wall 10 in any of a preselected positions by means of fasteners 22 which may be self-tapping screws or the like threaded through the drilled mounting apertures 18 in the pan and into the wall 10.

The planar body portion 16 is joined at opposite longitudinal sides to parallel longitudinal channels 24 and 26, which preferably are formed integral therewith. The longitudinal side channels 24 and 26 extend upwardly from the plane of the flat body portion 16 and are formed in the shape of inverted U-channels as seen in FIG. 2. As likewise seen in FIG. 2, the planar body portion 16 forms a longitudinal recess between the opposite parallel side channels 24 and 26 so that, when the pan 12 is attached to the wall 10 by means of the fasteners 22, the heads 23 of the fasteners are below the common plane of the upper surfaces 28 and 30 of the opposite parallel side channels so as not to form an obstruction for the electrical components to be mounted on the channels.

Side channels 24 and 26 are formed each by spaced opposed parallel side walls 32 and 34, which are connected by a bridge portion 36 positioned parallel to the body portion 16. The connecting bridge portions 36 of each side channel are each provided with a plurality of spaced apertures 38 preferably in the form of longitudinally oriented slots along the entire length of the channels, which are spaced as close together as physically possible without weakening the structure. These pluralities of spaced slots 28 are provided for attachment of the component 14 in such a manner as to bridge the recessed planar body portion 16 without interference with the heads 23 of the pan fasteners 22.

As illustrated in FIGS. 2 and 3, for quick and easy securement of the component 14 to the pan 12 at any selected position along its length, a plurality of captive nuts 40 are provided which are to be inserted in the side channels 24 and 26 from the ends thereof, as indicated in FIG. 1, after the pan has been attached to the wall. The nuts 40, after insertion into the channels 24 and 26, are retained between the sides 32 and 34 of the channels and are prevented from falling out by the wall 10 when the pan 12 is attached thereto, as shown in FIG. 2. After insertion of a sufficient number of nuts 40 into the side channels 24 and 26, the electrical component 14 is placed upon the pan for extension across the body portion 16 to rest upon the surfaces 28 and 30 of the side channels 24 and 26. The opposite flanges 15 of the component 14 are adapted to receive fasteners 42 at appropriate spaced distances corresponding to the distance between one row of slots 38 in channel 24 with the opposite row of slots 38 in channel 26 so as to permit extension of the fasteners 42 through any selected slots in the channels 24 and 26. Upon assembly, each of the fasteners 42 is screwed into a selected nut 40 in the channels 24 and 26 and the nuts are prevented from rotation upon tightening of the fasteners by means of the restricting side walls 32 and 34 of the channels, as seen in FIG. 3. Thus, the electrical component 14 can be easily and quickly attached to the pan 12 at any selected location along its length, the plurality of slots 38 in the channels 24 and 26 providing a substantially unlimited longitudinal positioning of the component 14 along the pan 12.

Figure 5A:
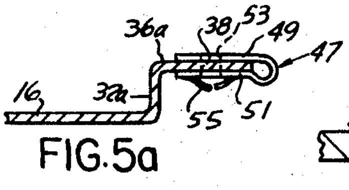
FIG. 5*a* illustrates in a fragmentary section a modification of the side portions of the mounting pan in which the channel structure has been eliminated.
Figure 5:
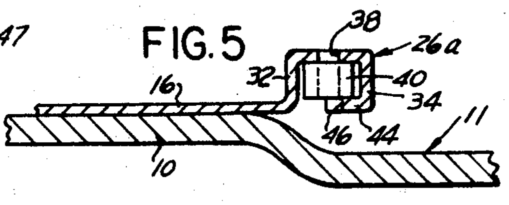
FIG. 5 illustrates in cross section a further embodiment of the side channel fastener retaining means which may be used in the various embodiments of the mounting pan.

As illustrated in FIG. 5, the channels 24 and 26 may be alternately constructed in the manner shown for example at channel **26*a*, which is constructed such as to provide a self-retaining feature for the captive nuts 40 which will be of advantage in installations on a wall of a cabinet or the like which diverges from its normal plane away from the open side of the channel 26*a*, as shown at 11 in FIG. 5. In this instance, and to facilitate the assembly in general, the lower end 44 of the outer side wall 34 of channels 26 and 24 respectively is reversely bent inwardly towards the body portion 16 substantially in the same plane therewith to close a substantial portion of the open side of the channel. The inner edge of the portion 44 is provided at intervals and in alignment with slots 38 with a plurality of recesses 46 to provide clearance for the fasteners threaded through the slots 38 and nuts 40 which are inserted in the channel from the ends thereof. The inwardly bent portion 44 of the channel prevents the nuts 40** from falling out of the channel in installations where the wall of the cabinet or the equipment does not provide a containment for the nuts as in the embodiment in FIG. 2.

Figure 4:
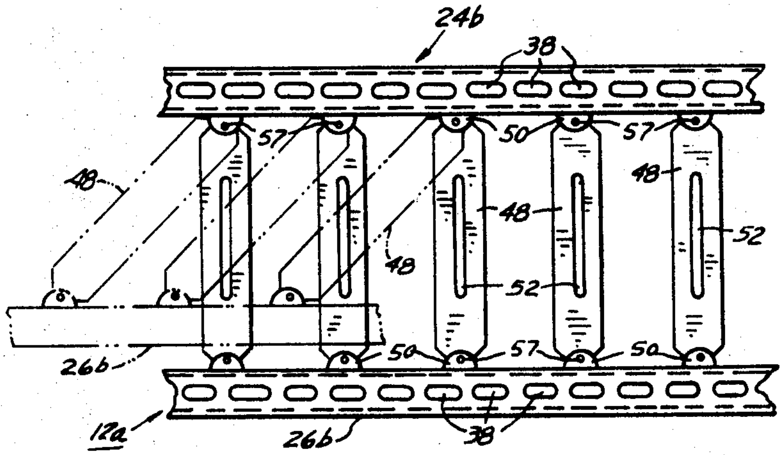
FIG. 4 is a plan view of an example of another embodiment of the present novel mounting pan made as a formed parallelogram structure.

A further modification is shown in FIG. 5*a* in which the channel structure for the pan has been eliminated and instead the sides are formed by a side portion **32*a* disposed substantially normal to the planar body portion 16. The upper end of the side portion is connected to a flange portion 36*a* extending at a right angle therefrom outwardly, which is adapted to support the electrical component. The flange portion 36*a* is provided with the usual plurality of slots 38 and sheet metal nuts are provided in the form of spring clips 47 having oppositely disposed spring legs 49 and 51. In assembly, the spring leg 49 is adapted to engage the upperside of the flange 36*a* and the spring leg 51 engages the underside of the flange 36*a* so as to clamp the flange in between them. The spring leg 49 is provided with an aperture 53 adapted to be aligned with a slot 38 for the extension of the fastener therethrough and the other spring leg 51 is provided with an aligned thread engaging portion 55** for engagement with the threads of the fastener, as is well known in the art. The clips 47 may be moved longitudinally along the flange 36*a* to any desired position and alignment with a slot 38. This structure may be substituted for the channel structures of either pan illustrated in FIGS. 1, 4 or 6.

With reference now to FIG. 4, in this embodiment the pan 12 is constructed such as to provide two opposite parallel channels 24*b* and 26*b*, which are constructed the same as channels 24 and 26 in FIG. 2 or as shown in FIGS. 5 and 5*a*. The parallel separate channels 24*b* and 26*b* are interconnected by a plurality of parallel braces or struts 48, which are pivotally connected at opposite ends to both channels 24*b* and 26*b* by means of pivot pins 57 retained in brackets 50 or the like, which are integral with or secured to the channels 24*b* and 26*b*. Each strut 48 is provided with at least one slot 52 for the securement of the pan 12*a* to a wall or the like. The provision of the parallel pivotal struts 48 interconnecting the opposed parallel channnels 24*b* and 26*b* provides a parallelogram structure, permitting the pan 12*a* to be adjusted in width to suit any particular size of electrical component. As indicated in broken lines in FIG. 4, by displacing the struts 48 diagonally, the channels 24*b* and 26*b* are brought closer together, thus reducing the width of the pan, the channels retain their parallel relationship in any position of adjustment due to the multiple strut connection. This structure is being cut to length after the necessary width adjustment has been made.

Figure 6:
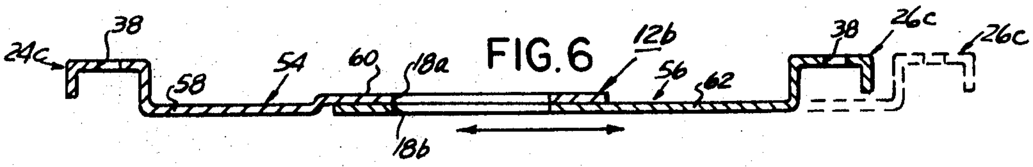
FIG. 6 is a cross section through an example of still another embodiment of the present novel mounting pan made in two sections for width adjustment.
Figure 7:
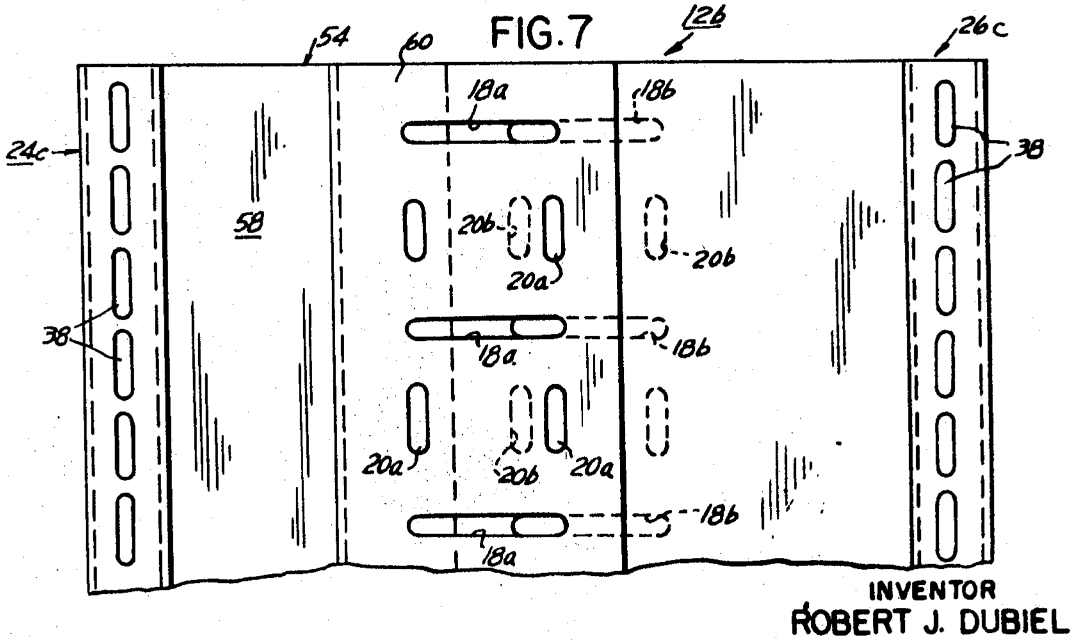
FIG. 7 is a plan view of the mounting pan shown in FIG. 6, seen in width adjusted position.

Still another embodiment, illustrated in FIGS. 6 and 7, shows a pan 12*b*, which is made up of two substantially identical sections 54 and 56, which are placed together in overlapping relationship along the longitudinal center of the pan. The section 54 of the pan 12*b* is constructed of a substantially planar body portion 58 and has a longitudinal side channel 24*c* along one side thereof. A portion 60 of the body portion 58, opposite the channel 24*c*, is raised from the plane of the remainder of the body portion in parallel relationship thereto. The amount which the portion 60 is raised corresponds substantially to the thickness of the sheet material of which the pan 12*b* is made. The other pan section 56 is similarly constructed of another planar body portion 62 having a side channel 26*c* along one side thereof. The body portion 62 is entirely flat and is adapted in assembly to be placed underneath the raised portion 60 of the body portion 58 of the other pan section 54, as seen in FIG. 6, to provide a homogeneous structure having a substantially flat bottom surface for abutment against a cabinet wall or the like (not shown). Both body portions 58 and 62 are each provided with a plurality of apertures or slots 18*a* and 18*b* and 20*a* and 20*b* in an arrangement similar to that shown in FIGS. 1 to 3. Normally, in the assembly shown in FIG. 6, the slots 18*a* and 18*b* (and 20*a* and 20*b*) of the body portions 58 and 62 are positioned such as to be in matching alignment with each other and by the provision of fasteners (not shown) through their aligned slots for attachment of the composite pan 12*b* to a wall or the like, in the manner as illustrated in FIG. 2, the pan portions 54 and 56 will be securely clamped together as a unit. As indicated in FIGS. 6 and 7 by the arrows and by the broken line position, pan 12*b* can be adjusted in width by sliding the pan sections 54 and 56 away from each other in a transverse direction to assume the position shown in FIG. 7. The limit of adjustment is substantially corresponded to the length of the transverse slots 18*a* and 18*b*.

Figure 8:
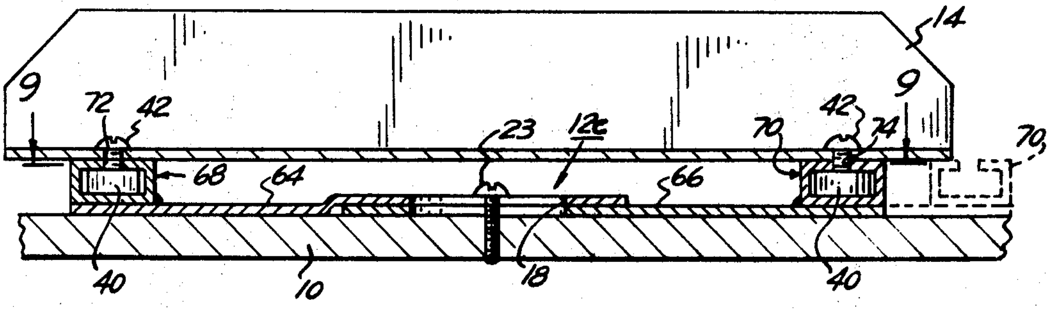
FIG. 8 is a cross section through still another embodiment in which the fastener retaining channels are welded to the top of the mounting pan.
Figure 9:
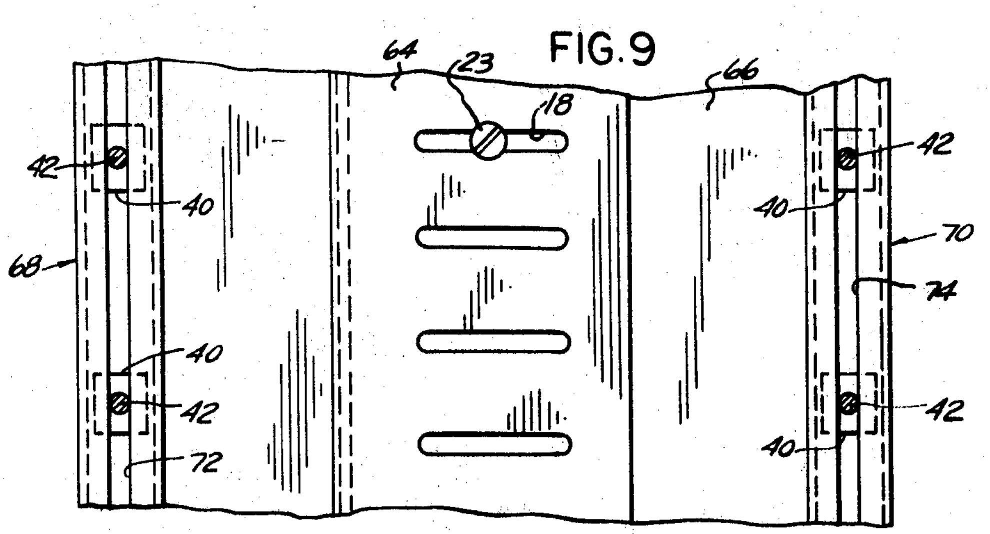
FIG. 9 is a top plan view of the embodiment shown in FIG. 8.

The embodiment in FIGS. 8 and 9 illustrates a mounting pan 12*c* which is similar to the adjustable mounting pan 12*b* in FIGS. 6 and 7 and comprises likewise a pan portion 64 and an opposite pan portion 66 which are disposed in overlapping relationship along the longitudinal center of the pan to allow the pan portions to be displaced outwardly for desired width adjustment of the pan as indicated in broken lines in FIG. 8.

The longitudinal outer edges of each pan portion 64, 66 are each provided with similar channels 68 and 70 respectively which are welded, brazed or otherwise secured to the pan portions. The channels 68 and 70 are adapted to receive and retain a plurality of nuts 40 and each channel is provided with an upper longitudinal continuous slot 72 and 74 respectively to allow the extension of fasteners 42 therethrough for securing engagement with the nuts 40 at any selected position along the slots by which the electrical component 14 will be secured to the opposite channels 68 and 70, as indicated in FIG. 8.

Figure 10:
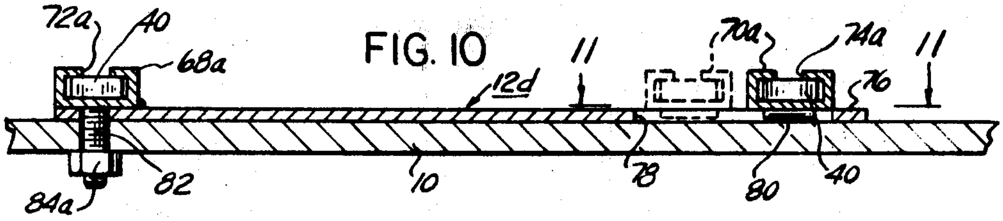
FIG. 10 is a cross section through a mounting pan illustrating a further modification.
Figure 11:
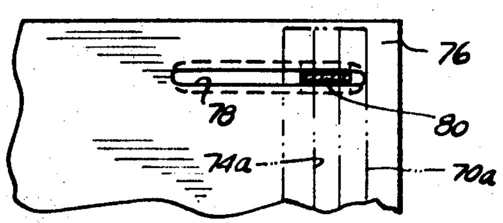
FIG. 11 is a fragmentary plan view of the mounting pan illustrated in FIG. 10.

In the embodiment illustrated in FIGS. 10 and 11, a solid mounting pan 12*d* is being provided which is similar to the mounting pan 12 in FIGS. 1 to 3 except for the omission of the integral side channels 24 and 26. In this instance a channel 68*a* is welded or otherwise secured on top of the mounting pan along one of its longitudinal sides. Channel 68*a* is adapted to receive and retain a plurality of nuts 40 and is provided with an upper longitudinal slot 72*a* for a purpose described above.

The opposite longitudinal side 76 of the mounting pan 12*d* is provided with at least two transverse dove-tail slots 78 disposed one at each end, which are adapted to receive a dove-tail key 80 for sliding engagement therein. The dove-tail key 80 is brazed or otherwise secured to the bottom of a longitudinal channel 70*a* which is the opposite counterpart of channel 68*a* and which is likewise adapted to receive and retain a plurality of nuts 40 and the upper portion of the channel 70*a* is similarly provided with a longitudinal continuous slot 74*a* for the purpose of securing fasteners to the nuts 40 at any selected position along the slot 74*a*. Thus, by the provision of the slot and dove-tail securement of the channel 70*a* to the mounting pan 12*d* the channel can be transversely adjusted to vary the distance between the channels 68*a* and 70*a* to accommodate various sizes of electrical components. It will be obvious that both channels can be adjustably secured in the above manner for width adjustment relative to each other.

As further illustrated in FIG. 10, the secured channel 68*a* may be provided with threaded studs 82 for extension through provided aligned apertures in the pan and the mounting panel or cabinet wall 10 for securement of the pan 12*d* to the wall 10 by means of a nut 84*a* or the like.

By means of the novel features disclosed in the present invention, a mounting pan for electrical components has been provided, which is adaptable to mount a plurality of electrical components at various selected locations along the pan. Captive fastening means for the components are being provided which permit the components to be conveniently and easily secured to the panel.

In further modifications, the present novel mounting pan is advantageously constructed so as to be adjustable in width over a wide range of adjustments in order to accommodate components of various sizes.

The present invention may be embodied in certain other forms without departing from the spirit and essential characteristics thereof, therefore, the present embodiments are to be considered in all respects as illustrative only and not restrictive, the scope of the invention being indicated by the appended claims rather than by the foregoing description.

I claim:

1. In an electrical installation, a mounting pan for mounting electrical components at a variety of selected locations, said mounting pan comprising:

a substantially flat elongated member having a pair of opposite parallel channels of U-shaped cross section, said channels being connected by an intermediate portion provided with a plurality of apertures for securement of said pan in said electrical installation by the extension of fasteners therethrough, said channels having each a flat support surface for the support of said electrical components, said support surface of each of said channels provided with slot means for the extension of fasteners therethrough, and a plurality of captive nuts retained in each of said said channels to be united with said fasteners for the securement of said components to said mounting pan, wherein each of said channels is partly closed by longitudinal retain portions extending inwardly from the outer ends of said channels to retain said captive nuts within said channels.

2. The mounting pan as defined in claim 1, in which each of said retaining portions in said channels is provided with a plurality of recesses aligned with said apertures to permit the extension of said fasteners therethrough.

3. The mounting pan as defined in claim 1, further comprising means for adjustably displacing said channels relative to each other in parallel alignment to vary the distance between said channels.

4. The mounting pan as defined in claim 3, in which said means for adjustably displacing said channels comprises a plurality of parallel struts pivotally connected to each of said channels, said plurality of struts defining said intermediate portion of said longitudinal member.

5. The mounting pan as defined in claim 1, in which said substantially flat elongated member comprises a pair of substantially identical oppositely arranged sections having each a longitudinal side channel and a planar body member, said body members being positioned in overlapping relationship and provided each with a plurality of an equal number of apertures for the extension of fasteners therethrough, said oppositely arranged sections being adapted for sliding adjustment relative to each other to permit a variable width adjustment and to be secured in said electrical installation in any selected adjusted position by the extension of said fasteners through aligned ones of said plurality of apertures.

6. A mounting pan for a plurality of electrical components to be mounted thereon at a multiple of selected locations comprising:

a planar body portion having longitudinal sides provided with parallel channels projecting from the plane of said body portion, said body portion being provided with a plurality of apertures at spaced predetermined locations for securement of said pan to a planar surface, each of said channels having a flat portion parallel with said body portion for the support of said components thereon in bridging relationship relative to said body portion, each of said flat portions of said channels being provided with aperture means for the extension of fasteners therethrough, and said channels being adapted to receive a plurality of nuts to be non-rotatably retained within said channels, wherein said nuts are retained in said channels by means integral with said channels, said means comprising a longitudinal flange extending inwardly of said channels.

7. The mounting pan as defined in claim 6, being provided with means for adjustment of said pan in transverse direction comprising a pair of planar body portions adjustably secured to said parallel channels.

8. The mounting pan as defined in claim 7, said means for adjustment of said pan comprising a plurality of parallel struts pivotally connected to each of said channels to provide an adjustable parallelogram structure.

9. In an electrical installation, a mounting pan for mounting electrical components at a variety of selected locations, said mounting pan comprising:

a substantially flat elongated member having a pair of opposite parallel channels of U-shaped cross section, said channels being connected by an intermediate portion provided with a plurality of apertures for securement of said pan in said electrical installation by the extension of fasteners therethrough, said channels having each a flat support surface for the support of said electrical components, said support surface of each of said channels provided with slot means for the extension of fasteners therethrough, a plurality of captive nuts retained in each of said channels to be united with said fasteners for the securement of said components to said mounting pan, and means for adjustably displacing said channels relative to each other in parallel alignment to vary the distance between said channels, wherein said means comprises a plurality of parallel struts pivotally connected to each of said channels, said plurality of struts defining said intermediate portion connecting said channels.

10. The mounting pan as defined in claim 9, in which said mounting pan is secured to a flat surface in said electrical installation in such a way that the open side of said channels face said surface by which said captive nuts are retained in said channels upon securement of said mounting pan to said flat surface.

11. The mounting pan as defined in claim 9, in which the open side of each of said channels is partly closed by longitudinal retaining portions extending inwardly from the outer ends of said channels in parallel alignment with said flat support surface of each of said channels to retain said captive nuts within said channels.

12. The mounting pan as defined in claim 11, in which each of said retaining portions in said channels is provided with a plurality of recesses aligned with said apertures to permit the extension of said fasteners therethrough.

13. In an electrical installation, a mounting pan for mounting electrical components at a variety of selected locations, said mounting pan comprising:

a substantially flat elongated member having a pair of opposite parallel channels of U-shaped cross section, said channels being connected by an intermediate portion provided with a plurality of apertures for securement of said pan in said electrical installation by the extension of fasteners therethrough, said channels having each a flat support surface for the support of said electrical components, said support surface of each of said channels provided with a slot means for the extension of fasteners therethrough, a plurality of captive nuts retained in each of said channels to be united with said fasteners for the securement of said components to said mounting pan, and means for adjustably displacing said channels relative to each other in parallel alignment to vary the distance between said channels, in which said means comprises a plurality of transversely disposed elongated slots in said flat elongated member and mounting means for one of said channels slidably engaging said transversely disposed slots.

14. The mounting pan as defined in claim 13, in which said mounting pan is secured to a flat surface in said electrical installation in such a way that the open side of said channels face said surface by which said captive nuts are retained in said channels upon securement of said mounting pan to said flat surface.

15. The mounting pan as defined in claim 13, in which the open side of each of said channels is partly closed by longitudinal retaining portions extending inwardly from the outer ends of said channels in parallel alignment with said flat support surface of each of said channels to retain said captive nuts within said channels.

16. The mounting pan as defined in claim 15, in which each of said retaining portions in said channels is provided with a plurality of recesses aligned with said apertures to permit the extension of said fasteners therethrough.

References Cited

UNITED STATES PATENTS

| | | | |
|---|---|---|---|
| 1,066,706 | 7/1913 | Caine | 220—3.4 |
| 1,700,120 | 1/1929 | Campbell | 248—300X |
| 1,833,561 | 11/1931 | Cobabe | 248—271 |
| 1,878,821 | 9/1932 | Daugherty | 248—274 |
| 2,316,389 | 4/1943 | Atkinson | 248—300 |
| 2,642,249 | 6/1953 | Samuels | 248—300X |
| 2,646,951 | 7/1953 | Sloyan | 248—23 |
| 2,919,879 | 1/1960 | Hume | 248—300X |
| 3,022,028 | 2/1962 | Reinhard | 248—23 |
| 3,065,523 | 11/1962 | Sloyan | 248—23X |
| 2,859,606 | 11/1958 | Scardino | 248—27 |

NILE C. BYERS, Jr., Primary Examiner

U.S. Cl. X.R.

317—99